(12) United States Patent
Lathrop et al.

(10) Patent No.: US 7,948,117 B2
(45) Date of Patent: May 24, 2011

(54) TRANSFER SWITCH CONTROLLER EMPLOYING ACTIVE INDUCTIVE LOAD CONTROL AND TRANSFER SWITCH INCLUDING THE SAME

(75) Inventors: Todd M. Lathrop, Oakdale, PA (US); Bert Popovich, Carnegie, PA (US); Jacob A. Hjemvick, Pittsburgh, PA (US); Samuel E. Faylo, Oakdale, PA (US)

(73) Assignee: Eaton Corporation, Cleveland, OH (US)

( * ) Notice: Subject to any disclaimer, the term of this patent is extended or adjusted under 35 U.S.C. 154(b) by 331 days.

(21) Appl. No.: 12/176,680

(22) Filed: Jul. 21, 2008

(65) Prior Publication Data

US 2010/0013308 A1  Jan. 21, 2010

(51) Int. Cl.
*H02J 7/00* (2006.01)
*H02J 9/00* (2006.01)

(52) U.S. Cl. .......................................... 307/64

(58) Field of Classification Search .................. 307/64, 307/11, 23, 86
See application file for complete search history.

(56) References Cited

U.S. PATENT DOCUMENTS

| | | | |
|---|---|---|---|
| 4,398,097 A | 8/1983 | Schell et al. | |
| 4,747,061 A | 5/1988 | Lagree et al. | |
| 4,760,278 A | 7/1988 | Thomson | |
| 4,894,796 A | 1/1990 | Engel et al. | |
| 5,081,367 A | 1/1992 | Smith et al. | |
| 5,210,685 A | 5/1993 | Rosa | |
| 5,397,868 A | 3/1995 | Smith et al. | |
| 6,172,432 B1 | 1/2001 | Schnackenberg et al. | |
| 6,181,028 B1 | 1/2001 | Kern et al. | |
| 6,191,500 B1 | 2/2001 | Toy | |
| 6,801,109 B2 | 10/2004 | Simms | |
| 6,849,967 B2 | 2/2005 | Lathrop et al. | |
| 7,015,599 B2 | 3/2006 | Gull et al. | |
| 7,356,384 B2 | 4/2008 | Gull et al. | |
| 2006/0018069 A1* | 1/2006 | Gull et al. | 361/90 |

OTHER PUBLICATIONS

Briggs & Stratton Corporation, "Home Generator Systems 100/200 Amp Automatic Transfer Switch", Installation & Operator's Manual No. 200010GS, Nov. 6, 2007, pp. 1-16.

* cited by examiner

*Primary Examiner* — Jared J Fureman
*Assistant Examiner* — Carlos Amaya
(74) *Attorney, Agent, or Firm* — Martin J. Moran

(57) ABSTRACT

A transfer switch controller is for a transfer switch, which cooperates with a plurality of loads including an air conditioner. The transfer switch controller includes a first input structured to input a thermostat start request signal for the air conditioner, a second input structured to determine power consumed by the loads, an output structured to output a start signal to the air conditioner, and a circuit. The circuit cooperates with the first input, the second input and the output. The circuit causes the start signal to be output by the output responsive to the thermostat start request signal of the first input if the determined power consumed by the loads is less than the difference between a predetermined maximum power output of a generator and a previous maximum peak start up power consumed by the air conditioner.

23 Claims, 3 Drawing Sheets

TRANSFER SWITCH CONTROLLER EMPLOYING ACTIVE INDUCTIVE LOAD CONTROL AND TRANSFER SWITCH INCLUDING THE SAME

BACKGROUND OF THE INVENTION

This invention pertains generally to transfer mechanisms and, more particularly, to transfer switches for selectively feeding power from one of two input lines to a load. The invention also pertains to transfer switch controllers for transfer switches.

BACKGROUND INFORMATION

Alternate power sources are provided for any number of applications, which cannot withstand a lengthy interruption in electric power. Typically, power is provided from a primary source with back-up power provided by a secondary source. Often, the primary source is a utility power source and the secondary source is an auxiliary power source, such as an engine driven generator or a second utility source. The transfers between the two power sources can be made automatically or manually.

Transfer switches are well known in the art. See, for example, U.S. Pat. Nos. 6,849,967; 6,801,109; 5,397,868; 5,210,685; 4,894,796; and 4,747,061. Transfer switches operate, for example, to transfer a power consuming load from a circuit with a normal power source to a circuit with an auxiliary power source. Applications for transfer switches include stand-by applications, among others, in which the auxiliary power source stands-by if the normal power source should fail. Facilities having a critical requirement for continuous electric power, such as hospitals, certain plant processes, computer installations, and the like, have a standby power source, often a diesel generator. A transfer switch controls electrical connection of the utility lines and the diesel generator to the facility load buses. In many installations, the transfer switch automatically starts the standby generator and connects it to the load bus upon loss of utility power, and reconnects the utility power to the load bus if utility power is reestablished.

Transfer switches commonly used to connect alternate power sources to a load, including networks, utilize a pair of power contacts each connecting one of the sources to the load. In order to prevent connecting unsynchronized sources together, the operation of the two power contacts is coordinated, typically by an interlock mechanism (e.g., mechanical and/or electrical), in order that only one power contact at a time can be turned on. In many instances, it is desirable to operate the transfer switch remotely. Typically, electric motors or solenoids have been used to operate the interlock mechanism on transfer switches. See, for example, U.S. Pat. Nos. 5,081,367; 4,760,278; and 4,398,097.

A transfer switch typically comprises a pair of power contacts, power contactors or circuit interrupters combined with a drive input and a linkage system. The preferred types of circuit interrupters have been molded-case switches and molded-case circuit breakers because these types are commercially available in a wide array of sizes and are relatively economical compared to other options. The preferred type of drive input depends on the application for the transfer switch. Usually motors are preferred, but at other times there is a clear preference for manually-operated mechanisms.

U.S. Pat. No. 6,181,028 discloses a transfer mechanism for a utility power source and a generator power source. A monitoring circuit within a transfer mechanism cabinet is operatively connected to the utility power source and the generator power source. As is conventional, the monitoring circuit monitors the power supplied by the utility power source. In response to a power outage from the utility power source, the monitoring circuit starts the internal combustion engine of the generator power source. The starting of the internal combustion motor causes the electrical generator of the generator power source to generate electrical power.

U.S. Pat. No. 6,172,432 discloses an automatic transfer switch in which excess loads are automatically shed and restored when an intermittent load combination falls back to acceptable limits as configured into a microcontroller. For example, microwave ovens, water pumps and air conditioning compressors create large but intermittent and transient loads. When such loads turn off, the microcontroller automatically restores previously cut out lower priority loads. Load shedding avoids the necessity of oversizing the generator and permits a larger combination of loads to be supported by the generator than the total load rating of the generator.

U.S. Pat. No. 6,191,500 discloses an uninterruptible power supply (UPS) system including a plurality of UPS modules electrically coupled to at least two utility sources. Generator paralleling switchgear includes a load priority and load shedding control system that adds or reduces load on a generator bus. Each load in the UPS system has a pre-assigned wattage rating, which the control system employs to determine how many loads can be added as generators come onto the generator bus. As generators are randomly connected to the generator bus, the control system signals for connection of the loads in ascending sequential priority, with the highest priority load being connected first.

Changes to Article 702 of the 2008 National Electric Code have dictated that for an automatic transfer switch: (1) the generator is sized to power the entire load; or (2) a form of active load management is utilized to ensure that the generator does not become overloaded. The first option is relatively more costly, since the typical electrical service in the United States is 200 A, with 400 A services becoming more common. Hence, the user would be forced to utilize a relatively large and expensive generator. The second option allows for a more cost effective solution, since a relatively smaller generator can be utilized to power the load.

Known appliances that consume significant power are those with highly inductive loads, such as motor- or compressor-based loads. For example, air conditioners have relatively high locked rotor currents and create a substantial load on the generator. A known technique to ensure that the generator does not become overloaded is to remove relatively high-current loads when the generator is called upon to power those and other loads.

It is known to control air conditioner loads by removing a thermostat signal from the air conditioner, thereby not allowing it to start. However, in Southern states or in other applications that require temperature control, this may not be a practical solution.

It is also known to only allow the air conditioner to start if there is a certain percentage of power available from the generator. For example, upon sensing that a thermostat input to start the air conditioner is active, and if the generator output is below 80% of its maximum power output, then a corresponding control allows the air conditioner to start. However, if the generator power output is greater than or equal to 80% of its maximum power output, then the air conditioner is not allowed to start. This may cause other loads to be shed, in order to cause the generator power output to be less than 80% of its maximum power output and, thus, allow the air conditioner to be started. Also, the locked rotor currents of air conditioners are known to vary from brand-to-brand and from size-to-size. Thus, generator power available for shed loads might not be utilized.

There is room for improvement in transfer switches.

There is also room for improvement in transfer switch controllers for transfer switches.

SUMMARY OF THE INVENTION

These needs and others are met by embodiments of the invention, which monitor the power output (e.g., without limitation, kW of a generator by using a current transformer on the load side of a transfer switch) and determine the maximum peak start up power required to start a load (e.g., without limitation, an air conditioner).

For example, when the generator is powering the load, the first time that the air conditioner is called upon to be started by a thermostat, automatic transfer switch logic does not allow the air conditioner to start unless the transfer switch power output is below a predetermined percentage of the full load capability of the generator. Upon start up of the air conditioner, the transfer switch logic determines the amount of power required to start the air conditioner and, if needed, saves a new maximum peak start up power. Then, the next time that the air conditioner is called upon to be started, the transfer switch logic only allows the air conditioner to start if the generator has enough power available (e.g., maximum power output of the generator less the current power output of the generator), which power is greater than the maximum peak start up power drawn by the air conditioner. After starting, a new peak start up power is determined, and, if needed, the maximum peak start up power is stored and used for the next air conditioner start up. This allows use of all of the power available from the generator, rather than waiting for the generator output to fall below a fixed percentage of its output.

For example, the automatic transfer switch logic is disabled when a primary power source (e.g., utility) is powering the load, although this logic continues to determine the new peak start up power and, if needed, store the maximum peak start up power required to start the air conditioner. This allows the system to keep up with the air conditioner power requirements in the event that they tend to increase with time.

In accordance with one aspect of the invention, a transfer switch controller is for a transfer switch which cooperates with a plurality of loads. The transfer switch controller comprises: a first input structured to input a start request signal for one of the loads; a second input structured to determine power consumed by the loads; an output structured to output a start signal to the one of the loads; and a circuit cooperating with the first input, the second input and the output, the circuit being structured to cause the start signal to be output by the output responsive to the start request signal of the first input if the determined power consumed by the loads is less than the difference between a predetermined value and a previous start up power consumed by the one of the loads.

The circuit may be structured to determine and store as the previous start up power consumed by the one of the loads a peak start up power consumed by the one of the loads based upon the difference between: (a) the determined power consumed by the loads a predetermined time after the start signal is output by the output, and (b) the determined power consumed by the loads before the start signal is output by the output.

As another aspect of the invention, a transfer switch for a plurality of loads comprises: a first input structured to input a first voltage from a first power source; a second input structured to input a second voltage from a second power source; a third input structured to input a start request signal for one of the loads; a fourth input structured to determine power consumed by the loads; a first output structured to output a start signal to the one of the loads; a second output structured to output power to the loads; a transfer mechanism structured to selectively electrically connect one of the first input and the second input to the second output; and a circuit cooperating with the third input, the fourth input and the first output, the circuit being structured to cause the start signal to be output by the first output responsive to the start request signal of the third input if the determined power consumed by the loads is less than the difference between a predetermined value and a previous start up power consumed by the one of the loads, the circuit also being structured to cooperate with the first input, the second input and the transfer mechanism to cause the transfer mechanism to electrically connect one of the first input and the second input to the second output.

The circuit may be structured to store as the previous start up power consumed by the one of the loads a predetermined value times the difference between: (a) the determined power consumed by the loads after the start signal is output by the output, and (b) the determined power consumed by the loads before the start signal is output by the output. The last such predetermined value may be one plus a predetermined percentage.

The previous start up power consumed by such one of the loads may be peak start up power consumed by such one of the loads during the time that such one of said loads is started.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

The invention is described in association with a transfer switch including an inductive load, such as an air conditioner, powered by a generator, although the invention is applicable to transfer switches and transfer switch controllers for a wide range of loads having any number of phases powered by a wide range of power sources having any number of phases.

Figure 1:
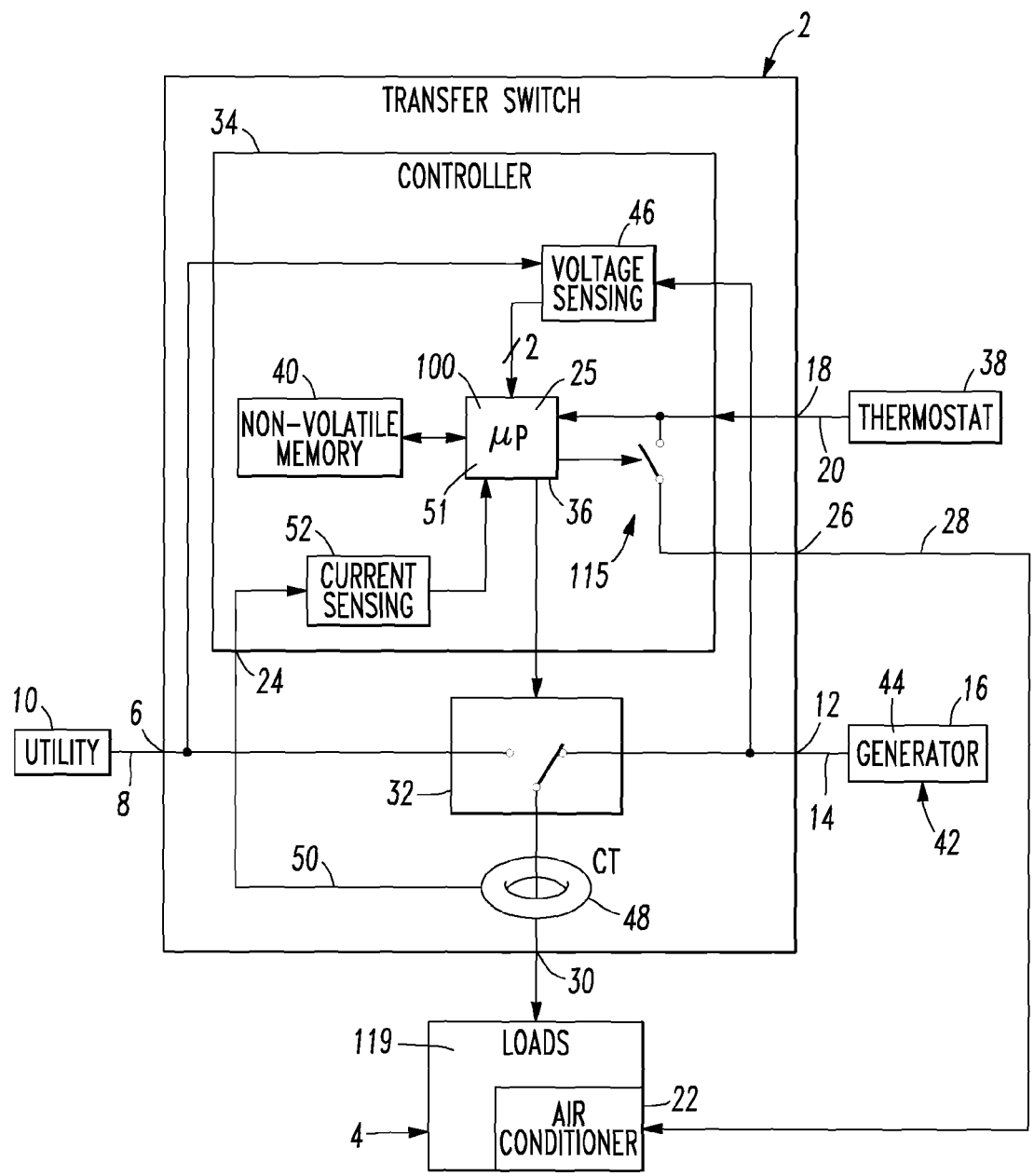
FIG. 1 is a block diagram of a transfer switch including a transfer switch controller accordance with embodiments of the invention.

Referring to FIG. 1, a transfer switch 2 for a plurality of loads 4 includes a first input 6 structured to input a first voltage 8 from a first power source 10, a second input 12 structured to input a second voltage 14 from a second power source 16, a third input 18 structured to input a start request signal 20 for a load 22 of the loads 4, and a fourth input 24 structured to determine power 25 consumed by the loads 4. A first output 26 is structured to output a start signal 28 to the load 22. A second output 30 is structured to output power to the loads 4. A transfer mechanism 32 is structured to selectively electrically connect one of the first input 6 and the second input 12 to the second output 30. A circuit 34 (e.g., without limitation, a transfer switch controller) cooperates with the third input 18, the fourth input 24 and the first output 26. The circuit 34 is structured to cause the start signal 28 to be output by the first output 26 responsive to the start request signal 20 of the third input 18 if the determined power 25 consumed by the loads 4 is less than the difference between a predetermined value and a previous start up power consumed by the load 22. The circuit 34 is also structured to cooperate with the first input 6, the second input 12 and the transfer mechanism 32 to cause the transfer mechanism 32 to electrically connect one of the first input 6 and the second input 12 to the second output 30.

Example 1

The load 22 is an air conditioner. The start request signal 20 is a thermostat signal, which requests that the air conditioner 22 be started.

Example 2

The circuit 34 includes a processor, such as the example microprocessor (μP) 36, which is structured to sense the thermostat signal 20 and to cause the start signal 28 to be output by the output 26.

Example 3

The predetermined value of the circuit 34 is the maximum power output 44 of the second power source (e.g., without limitation, a generator 16).

Example 4

The start request signal 20 is a closed contact (not shown) from a thermostat 38.

Example 5

The closed contact 20 requests that the air conditioner 22 be started.

Example 6

As will be discussed, below, in connection with FIG. 2B, the circuit 34 is structured to determine the previous start up power consumed by the air conditioner 22 and store the maximum peak start up power in a non-volatile memory 40. The previous start up power consumed by the air conditioner 22 is peak start up power consumed by the air conditioner 22 based upon the difference between: (a) the determined power 25 consumed by the loads 4 a predetermined time after the start signal 28 is output by the output 26, and (b) the determined power 25 consumed by the loads 4 before the start signal 28 is output by the output 26.

Example 7

The first input 6 is structured to input from a utility power source 10. The second input 12 is structured to input from a generator power source 42 including the generator 16 having a maximum power output 44. As will be discussed, below, in connection with FIG. 2A, when the generator 16 is powering the loads 4, the first time that the start request signal 20 is input by the third input 18, the circuit 34 does not cause the start signal 28 to be output by the output 26 unless the determined power 25 consumed by the loads 4 is below a predetermined percentage of the generator maximum power output 44.

Example 8

The predetermined percentage is, for example, about 80%.

Example 9

As will be discussed, below, in connection with FIGS. 2A and 2B, when the transfer mechanism 32 electrically connects the first input 6 to the second output 30, the circuit 34 unconditionally causes the start signal 28 to be output by the first output 26 responsive to the start request signal 20. The circuit 34 is further structured to store as the previous start up power consumed by the air conditioner 22 in the non-volatile memory 40 the difference between: (a) the determined power 25 consumed by the loads 4 after the start signal 28 is output by the output 26, and (b) the determined power 25 consumed by the loads 4 before the start signal 28 is output by the output 26.

Example 10

The circuit 34 may be structured to store as the previous start up power consumed by the air conditioner 22 a predetermined value times the difference defined by Example 9. Such a predetermined value may be one plus a suitable predetermined percentage (e.g., without limitation, one plus 10% or 1.1, although any suitable value may be used).

Example 11

As is conventional, the μP 36 cooperates with a voltage sensing circuit 46 to input the first voltage 8 from the first power source 10 and the second voltage 14 from the second power source 16. In turn, as is also conventional, the μP 36 cooperates with the transfer mechanism 32 to selectively electrically connect one of the first input 6 and the second input 12 (as shown) to the second output 30.

Example 12

The example transfer switch 2 includes a suitable sensor, such as the example current transformer (CT) 48 disposed about the second output 30 and being structured to sense current flowing to the second output 30 and output a sensed current value 50. A suitable sensing routine 52 of μP 36 outputs the determined power 25 (e.g., based upon the product of the sensed current value 50 as sensed by a current sensing circuit 51 and a nominal line voltage; based upon the product of the sensed current value 50 and the voltage output by the voltage sensing circuit 46 corresponding to the selected one of the power sources 10,16). The μP 36 knows which power source is connected since it controls the transfer mechanism 32. Therefore, the circuit 34 can readily determine the power consumed by the loads 4 from the sensed current value 50 times the voltage of the second output 30.

Example 13

Figure 2A:
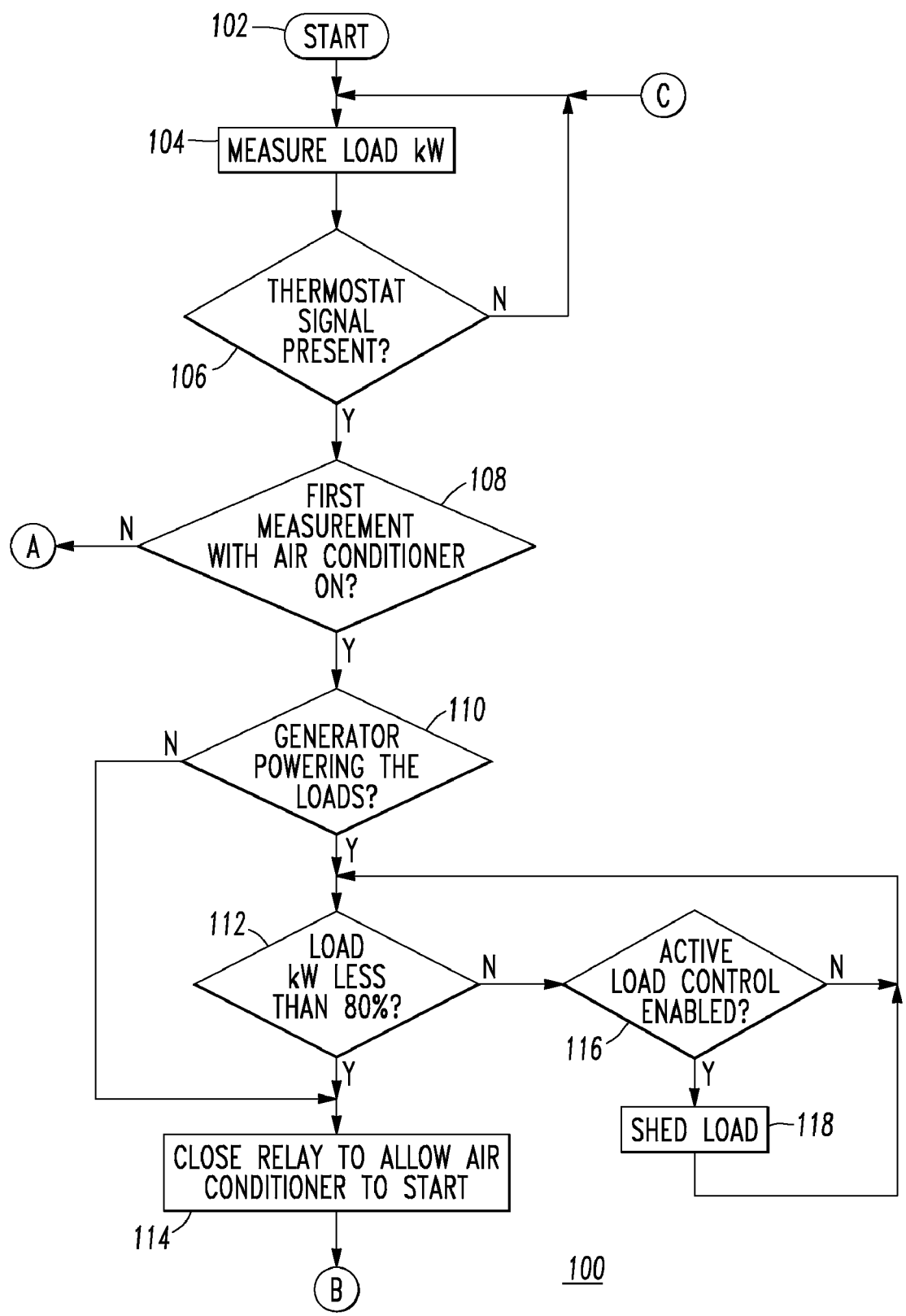
FIGS. 2A-2B form a flowchart of an inductive load control routine executed by the microprocessor of FIG. 1.
Figure 2B:
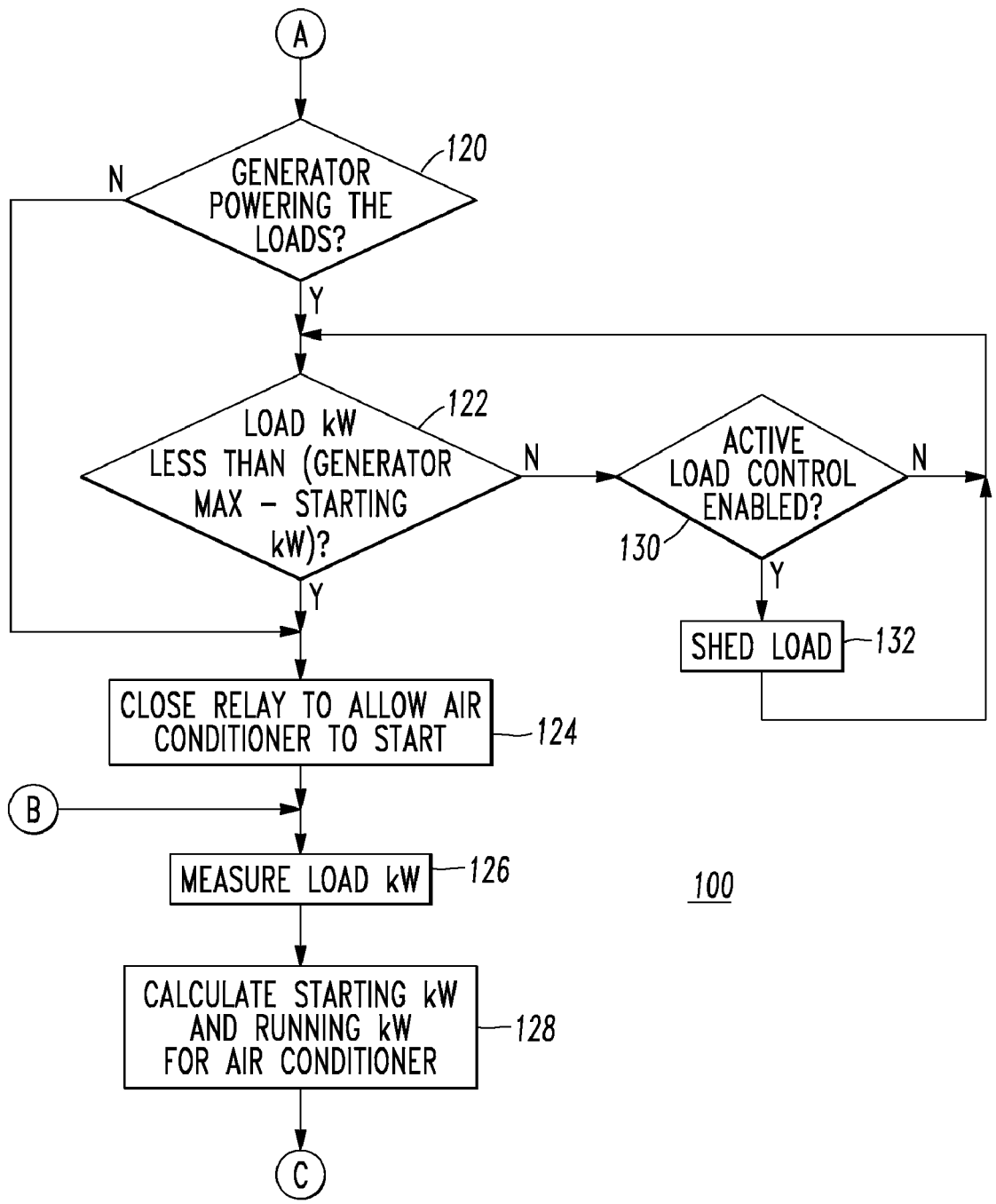

Referring to FIGS. 2A-2B, an inductive load control routine 100 executed by the μP 36 of FIG. 1 is shown. For example and without limitation, current sampling is executed periodically in a background routine (not shown). When the relay 115 of FIG. 1 closes to allow the air conditioner 22 to start, the sampling rate increases to better capture the profile of the air conditioner starting current. Then, after about 3 to 5 seconds, the current sampling is again executed in the background routine.

After starting at 102, the μP 36 measures, at 104, the load power (e.g., kW), for example, as was discussed above in connection with Example 12. Next, at 106, the μP 36 determines if the start request signal 20 (e.g., from thermostat 38 of FIG. 1) is present. If not, then step 104 is repeated. Otherwise, at 108, it is determined if this was the first measurement of the load power (e.g., by testing a suitable flag in non-volatile memory 40) with the air conditioner 22 being on. If not, then execution resumes at 120 of FIG. 2B. Otherwise, at 110, it is determined if the transfer switch 2 is powering the loads 4 from the generator 16. If so, then at 112, it is determined if the load power (generator output) from step 104 is less than a predetermined value (e.g., without limitation, 80%; any suitable value or percentage) of the maximum power output 44 of the generator 16 (e.g., as stored in non-volatile memory 40). If so, or if the test failed at 110, then at 114, the μP 36 commands a relay 115 (FIG. 1) to close in order to output the start signal 28 and start the air conditioner 22. Then, execution resumes at 126 of FIG. 2B.

The thermostat start request signal 20 (FIG. 1) can be a contact that opens (e.g., to not run the air conditioner 22) or closes (e.g., to run the air conditioner 22). This signal 20 calls for the air conditioner 22 to start. The contact (not shown) is in series with a normally open contact of the transfer switch relay 115, such that the output start signal 28 is controlled by the transfer switch circuit 34.

If the test failed at 112, then, at 116, it is determined if active load control is enabled (e.g., as defined by a flag stored in non-volatile memory 40). If so, then at 118, one of the other loads 119 (FIG. 1) is shed using a conventional load shedding circuit (not shown). After 118, or if the test failed at 116, execution resumes at 112.

If the test failed at 108, then, at 120 of FIG. 2B, it is determined if the transfer switch 2 is powering the loads 4 from the generator 16. If so, then at 122, it is determined if the load power from step 104 is less than the difference between: (a) the maximum power output 44 of the generator 16 (e.g., as stored in non-volatile memory 40) and (b) a starting kW value (e.g., as stored in non-volatile memory 40), as will be explained. If so, or if the test failed at 120, then at 124, the μP 36 commands the relay 115 (FIG. 1) to close in order to output the start signal 28 and start the air conditioner 22. Then, at 126, the μP 36 measures the load power (e.g., kW), for example, as above at 104. Next, at 128, the μP 36 calculates the starting kW and the running kW for the air conditioner 22 as discussed below in connection with Examples 14 and 15, respectively. For example, these values are periodically written (e.g., without limitation, once per hour) to the non-volatile memory 40 and, also, every time that power fails. For example, a supercap (super capacitor) (not shown) powers the μP 36 for several minutes when power fails. Hence, there is ample time to write the values into the non-volatile memory 40 when a power failure is detected.

The next time that the thermostat 38 calls for the start of the air conditioner 22, as determined at 106 of FIG. 2A, step 122 verifies that there is enough power to start the air conditioner 22 by ensuring that the generator power output plus the stored maximum peak start up power for the air conditioner is less than the maximum power output 44 of the generator 16. If so, then the air conditioner 22 is started at 124. Otherwise, a load shedding routine is executed at step 132 as will be described.

If the test failed at 122, then, at 130, it is determined if active load control is enabled (e.g., as defined by a flag stored in non-volatile memory 40). If so, then at 132, one of the other loads 119 (FIG. 1) is shed using a conventional load shedding circuit (not shown). After 132, or if the test failed at 130, execution resumes at 122. By learning what is occurring with the air conditioner 22, the transfer switch circuit 34 is able to power the greatest amount of the loads 119 while still adhering to the requirements of the 2008 National Electric Code. This optimizes the output of the generator 16.

Example 14

At step 128, starting kW is the peak power during the start of the air conditioner 22. The maximum peak start up power is stored in non-volatile memory 40. The starting kW is only measured when the thermostat signal 20 is present and the air conditioner control relay 115 transitions from being de-energized to energized. Some of the loads 119 that are not controlled could, in theory, change during that time. Here, the transfer switch circuit 34 assumes that the load change, at this time, is solely due to the air conditioner 22. However, it will be appreciated that a dedicated sensor (not shown) for the air conditioner 22 could be employed for this purpose, while the disclosed CT 30 can be used for measuring the running kW, which is the steady state power of the air conditioner 22 plus the other loads 119 of the loads 4.

The starting kW is determined by the μP 36 a suitable time after the start signal 28 is output by the output 26. For example, the starting kW consumed by the air conditioner 22 can be determined from the difference between: (a) the determined power 25 consumed by the loads 4 after the start signal 28 is output, and (b) the determined power 25 consumed by the loads 4 before the start signal 28 is output. This determination of the peak start up power is made, for example, over a predetermined period (e.g., without limitation, within the first five seconds after the air conditioner control relay 115 is energized) in order to ascertain the peak power. In order to account for nominal variations in the starting power due to nominal variations in inrush current, the determined starting kW can be increased by a predetermined value (e.g., without limitation, one plus a suitable percentage (e.g., without limitation, a 10% margin)). If the starting kW is greater than the previously stored maximum peak start up power in non-volatile memory 40, then the new starting kW is stored in non-volatile memory 40 as the new maximum peak start up power for use at the next start request as determined at 106 of FIG. 2A.

Example 15

Running kW is the steady state power of the air conditioner 22 plus the other loads 119 of the loads 4. This value is continuously measured and is stored in the non-volatile memory 40. The running kW is employed to control conventional load control relays (not shown) on an active load control board (not shown) of the transfer switch 2 in connection with step 118 of FIG. 2A and step 132 of FIG. 2B. Even steps 116-118 and 130-132 shed a number of the loads 119, other than the air conditioner 22, if the determined power 25 consumed by the loads 4 meets either of the tests of steps 112 and 122, respectively. The next time that the air conditioner 22 is called upon to start, the transfer switch circuit 34 only allows the air conditioner to start if the generator 16 has enough power available, which available power is greater than the maximum peak start up power drawn by the air conditioner 22. The active load control sheds enough of the loads 119 to allow the air conditioner 22 to start based upon the current generator power output plus the maximum peak start up power being less than the maximum power output 44 of the generator 16.

The air conditioner 22 could be running, for example, for several minutes or longer. During that time, there is the initial peak power (starting kW) followed by the steady-state power (running kW). Since the thermostat signal 20 is still active when tested at 108, even steps 120-132 can be executed multiple times. This permits continuous load shedding, if needed at even steps 130-132, or recalculation of the running kW at step 128.

The disclosed transfer switch circuit 34 senses the peak power to start the air conditioner 22 at each start thereof. If the current peak power is greater than a previously stored maximum peak start up power, then the current peak power is stored as the new maximum peak start up power, as was discussed above in connection with step 128 of FIG. 2B. That stored amount is employed at step 122 of FIG. 2B to determine if the generator 16 has sufficient output power to start the air conditioner 22 the next time that the thermostat 38 calls for the start of the air conditioner. This permits changes in the air conditioner 22 due to, for example and without limitation, manufacturer, age, type and/or temperature, and allows for full utilization of the generator power output rather than partial utilization thereof. The maximum peak start up power is preferably increased by a suitable percentage to allow for variations in starting current.

The disclosed automatic transfer switch 2 allows for the inrush current of the air conditioner 22 to change or vary as, for example, the air conditioner 22 ages and its internal starting capacitors (not shown) become relatively weaker, or if other factors might cause the inrush current to vary over time. The transfer switch circuit 34 senses that relatively more starting current is required and ensures that the air conditioner 22 is not started until the generator 16 has enough available power to start the air conditioner.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A transfer switch controller for a transfer switch, said transfer switch cooperating with a plurality of loads, said transfer switch controller comprising:
a first input structured to input a start request signal for one of said loads;
a second input structured to determine power consumed by said loads;
an output structured to output a start signal to said one of said loads; and
a circuit cooperating with said first input, said second input and said output, said circuit being structured to cause the start signal to be output by said output responsive to the start request signal of said first input if the determined power consumed by said loads is less than the difference between a predetermined value and a previous peak start up power consumed by said one of said loads.

2. The transfer switch controller of claim 1 wherein said one of said loads is an air conditioner; and wherein said start request signal is a thermostat signal, which requests that said air conditioner be started.

3. The transfer switch controller of claim 2 wherein said circuit comprises a processor; and wherein said processor is structured to sense said thermostat signal and to cause the start signal to be output by said output.

4. The transfer switch controller of claim 1 wherein said circuit is structured to store as the previous peak start up power consumed by said one of said loads the difference between: (a) the determined power consumed by said loads after the start signal is output by said output, and (b) the determined power consumed by said loads before the start signal is output by said output.

5. The transfer switch controller of claim 4 wherein said circuit comprises a processor and a non-volatile memory; and wherein said processor is structured to store said difference in said non-volatile memory after the start signal is output by said output.

6. The transfer switch controller of claim 1 wherein said circuit is structured to store as the previous peak start up power consumed by said one of said loads a predetermined value times the difference between: (a) the determined power consumed by said loads after the start signal is output by said output, and (b) the determined power consumed by said loads before the start signal is output by said output.

7. The transfer switch controller of claim 1 wherein said predetermined value is maximum power output of a generator.

8. The transfer switch controller of claim 1 wherein said start request signal is a closed contact.

9. The transfer switch controller of claim 8 wherein said one of said loads is an air conditioner; and wherein said closed contact requests that said air conditioner be started.

10. The transfer switch controller of claim 1 wherein said circuit is structured to determine and store as the previous peak start up power consumed by said one of said loads a peak start up power consumed by said one of said loads based upon the difference between: (a) the determined power consumed by said loads a predetermined time after the start signal is output by said output, and (b) the determined power consumed by said loads before the start signal is output by said output.

11. A transfer switch for a plurality of loads, said transfer switch comprising:
a first input structured to input a first voltage from a first power source;
a second input structured to input a second voltage from a second power source;
a third input structured to input a start request signal for one of said loads;
a fourth input structured to determine power consumed by said loads;
a first output structured to output a start signal to said one of said loads;
a second output structured to output power to said loads;
a transfer mechanism structured to selectively electrically connect one of said first input and said second input to said second output; and
a circuit cooperating with said third input, said fourth input and said first output, said circuit being structured to cause the start signal to be output by said first output responsive to the start request signal of said third input if the determined power consumed by said loads is less than the difference between a predetermined value and a previous peak start up power consumed by said one of said loads, said circuit also being structured to cooperate with said first input, said second input and said transfer mechanism to cause said transfer mechanism to electrically connect one of said first input and said second input to said second output.

12. The transfer switch of claim 11 wherein said first input is structured to input from a utility power source; wherein said second input is structured to input from a generator power source including a generator having a maximum power output; and wherein when the generator is powering said loads, the first time that the start request signal is input by said third input, said circuit does not cause the start signal to be output by said output unless the determined power consumed by said loads is below a predetermined percentage of the maximum power output of the generator.

13. The transfer switch of claim 12 wherein said predetermined percentage is about 80%.

14. The transfer switch of claim 11 wherein said first input is structured to input from a utility power source; wherein when said transfer mechanism electrically connects said first input to said second output, said circuit unconditionally causes the start signal to be output by said output responsive to the start request signal; and wherein said circuit is further structured to store as the previous peak start up power consumed by said one of said loads the difference between: (a) the determined power consumed by said loads after the start signal is output by said output, and (b) the determined power consumed by said loads before the start signal is output by said output.

15. The transfer switch of claim 11 wherein said circuit is structured to store as the previous peak start up power consumed by said one of said loads a predetermined value times the difference between: (a) the determined power consumed by said loads after the start signal is output by said output, and (b) the determined power consumed by said loads before the start signal is output by said output.

16. The transfer switch of claim 15 wherein the last said predetermined value is one plus a predetermined percentage.

17. The transfer switch of claim 11 wherein said previous peak start up power consumed by said one of said loads is peak start up power consumed by said one of said loads during the time that said one of said loads is started.

18. The transfer switch of claim 11 wherein said circuit comprises a processor and a non-volatile memory; wherein said processor is structured to store said difference in said non-volatile memory after the start signal is output by said output; and wherein said difference is a maximum peak start up power consumed by said one of said loads.

19. The transfer switch of claim 18 wherein said circuit determines steady state power of said one of said loads after the start signal is output by said output and stores the steady state power in said non-volatile memory for use by a load shedding function.

20. The transfer switch of claim 11 wherein said second output has a voltage; and wherein said circuit comprises a current transformer disposed about said second output and a processor, said current transformer being structured to sense current flowing to said second output and output a sensed current value to said processor, said processor being structured to calculate the determined power consumed by said loads from the sensed current value times the voltage of said second output.

21. The transfer switch of claim 11 wherein said one of said loads is an air conditioner; and wherein said start request signal is a thermostat signal, which requests that said air conditioner be started.

22. The transfer switch of claim 21 wherein upon start up of the air conditioner, said circuit stores as the previous peak start up power consumed by said one of said loads the amount of power consumed by start up of the air conditioner.

23. The transfer switch of claim 11 wherein said circuit is further structured to shed a number of said loads, other than said one of said loads, if the determined power consumed by said loads is greater than or equal to the difference between the predetermined value and the previous peak start up power consumed by said one of said loads.

* * * * *